United States Patent [19]

Vater

[11] Patent Number: 4,702,724
[45] Date of Patent: Oct. 27, 1987

[54] DRIVE SHAFT SHIELD ASSEMBLY

[75] Inventor: George R. Vater, Clarendon Hills, Ill.

[73] Assignee: J. I. Case Company, Racine, Wis.

[21] Appl. No.: 880,200

[22] Filed: Jun. 30, 1986

[51] Int. Cl.[4] .............................................. F16C 1/26
[52] U.S. Cl. ..................................... 464/172; 74/609; 403/23
[58] Field of Search ................. 74/608, 609; 180/75.2, 180/233, 237, 906; 301/124 H, 128; 403/23; 464/170, 172, 901

[56] References Cited

U.S. PATENT DOCUMENTS

| 1,774,226 | 8/1930 | Chettick | 464/172 X |
| 1,868,474 | 7/1932 | Strehlow | 180/906 X |
| 2,027,329 | 1/1936 | Van Ranst | 464/172 X |
| 3,270,830 | 9/1966 | Barrett et al. | 301/128 X |
| 3,344,618 | 10/1967 | Young | 464/172 X |
| 3,418,828 | 12/1968 | Carns | 464/172 X |
| 4,130,998 | 12/1978 | Einsel et al. | 464/172 X |

FOREIGN PATENT DOCUMENTS

| 962709 | 4/1957 | Fed. Rep. of Germany | 464/172 |
| 2249967 | 4/1974 | Fed. Rep. of Germany | 74/609 |
| 1208959 | 2/1960 | France | 74/609 |
| 442313 | 2/1936 | United Kingdom | 74/609 |

Primary Examiner—Daniel P. Stodola
Attorney, Agent, or Firm—Peter N. Jansson, Ltd.

[57] ABSTRACT

An easily removable tubular shield assembly for shielding a drive shaft extending to the front wheels of a work vehicle, such as a tractor. The shield assembly has a plurality of telescoping tubular members forming a continuous tube, and one or more removable devices to lock the tubular members into fixed relative axial positions. The tubular shield can be shortened to expose the ends of the drive shaft and facilitate complete or partial removal of the drive shaft.

17 Claims, 2 Drawing Figures

DRIVE SHAFT SHIELD ASSEMBLY

FIELD OF THE INVENTION

This invention is related generally to shields for work vehicle drive shafts and, more particularly, to removable shield assemblies for drive shafts on the front wheel drive apparatus of tractors.

BACKGROUND OF THE INVENTION

Tractors and other similar work vehicles which include front wheel drive apparatus have a drive shaft which is typically lower and in a more exposed position than other drive shafts. Such drive shafts and the universal joints and other devices at the ends thereof can easily become wrapped with grass, crop debris, and the like. For this and other reasons, it is desirable to shield such drive shafts.

Many different types of drive shaft shields have been used. Over the years, considerable efforts have been directed toward the improvement of shields for work vehicle drive shafts, and for drive shafts on tractor front wheel drive apparatus. However, such prior shields have a number of problems and disadvantages.

In some cases, prior drive shaft shields inadequately shield the drive shaft, allowing crop debris and grass to contact the drive shaft and become wrapped around it. Some of such shafts shield only one side of the drive shaft. Others which more completely surround and shield the drive shaft are often difficult to remove, as sometimes is required for service. Certain prior drive shaft shields must be removed completely in order to gain access to even one end of the drive shaft.

Some drive shaft shields are not adjustable or at least not easily adjustable to accommodate tolerance variations, such as variations in the length of the drive shaft from one vehicle to another. Furthermore, certain of such drive shaft shields do not readily accommodate the normal variations which occur in the length of the shafts and the related shielded apparatus during operation of the tractor.

In summary, there is a need for an improved drive shaft shield assembly which is easy to assemble, may readily be removed or partially removed to allow repairs, may easily be adjusted to accommodate all tolerance variations from vehicle to vehicle, and once mounted can accommodate length variations in the shielded apparatus during operation of the tractor or other work vehicle.

SUMMARY OF THE INVENTION

This invention is an improved work vehicle drive shaft shield assembly overcoming certain problems and deficiencies of the prior art, including those mentioned. The invention is a tubular shield which is particularly useful for shielding drive shafts on the front wheel drive apparatus of tractors.

The shield assembly of this invention includes a plurality of telescoping tubular members forming a continuous tube having, when in place shielding a drive shaft, a first opening at one end of the drive shaft and a second opening at the other end of the drive shaft. The shield assembly also includes means at such first and second openings to secure the continuous tube to the work vehicle and means to adjustably lock the tubular members into fixed relative axial positions.

Such tubular shield may be substantially shortened by relative telescoping movement of the tubular members after removal of the locking members. This allows the ends of the drive shaft to be exposed to facilitate removal of the drive shaft and/or complete removal of the tubular shield.

The plurality of telescoping tubular members preferably comprises a main tubular member and at least one tubular end piece slidably engaged with it and forming one of the end openings. Most preferably, there are two tubular end pieces forming the first and second openings, respectively, at the end of the tubular shield.

The securing means at the openings at the ends of the tubular shield are preferably annular edges which form such openings. Such edges are themselves preferably adapted for sliding telescoping engagement with the work vehicle at points beyond the ends of the drive shaft. The work vehicle preferably has circular hubs which extend around the drive shaft axis and are each positioned to receive one of the annular edges forming the end openings of the tubular shield. Such sliding engagement on the hubs allows the tubular shield to accommodate dimensional variation between the points of attachment to the work vehicle.

Certain preferred embodiments of this invention include slot-key means along one or both of the annular edges of the end openings. A slot is preferably located along such annular edge to receive a key which is formed on the circular hub over which the annular edge is inserted. When such key is inserted into such slot, rotational movement of the tubular shield is prevented.

The locking means by which each adjacent pair of telescoping members are secured in fixed relative axial positions preferably includes holes in each of such telescoping members and a removable pin means which is insertable through such holes after they have been aligned by telescoping adjustment of such tubular members. One of the telescoping members of each adjacent pair preferably has a series of holes in different positions along a portion of its length such that the length of the continuous tube may be fixed by interlocking such adjacent pair at chosen relative axial positions. This allows the length of the tubular shield to be set to accommodate the length of the drive shaft and related apparatus to be shielded.

To remove the tubular shield of this invention, the pin means is withdrawn to allow the tubular end piece to be slid farther onto the main tubular member or other tubular member with which it is telescopically engaged. This exposes one end of the drive shaft, allowing detachment of the universal joint or other connection means at that point. The other end of the drive shaft can be exposed in the same way, or both the ends can be exposed.

A number of choices exist for removal of the tubular shield. For example, after exposing one end of the drive shaft, such end may be detached from its associated shaft. Then that end of the drive shaft may be moved laterally after which the entire tubular shield may be pulled off the drive shaft.

The tubular shield may be reassembled over the drive shaft in various ways, each of which is the reverse order of a shield removal operation. Finally, the locking pin or pins are inserted to fix the shield at the appropriate length to hold it properly in place.

OBJECTS OF THE INVENTION

It is an object of this invention to provide an improved drive shaft shield assembly overcoming some of the problems and shortcomings of devices of the prior art.

Another object of this invention is to provide an improved drive shaft shield assembly for drive shafts which are part of the front wheel drive apparatus of tractors.

Another object of this invention is to provide an improved drive shaft shield assembly which is easily assembled and may be easily removed, completely or partially, for service.

Yet another object of this invention is to provide an improved shield assembly which may readily be adjusted for wide tolerances in the length of various drive lines to be shielded.

Another object of this invention is to provide an improved shield assembly which readily accommodates dimensional variations occurring in the tractor during its operation.

Still another object of this invention is to provide an improved drive shaft shield assembly which may be removed and reattached in different ways.

These and other important objects will be apparent from the following descriptions and from the drawings, wherein:

DETAILED DESCRIPTIONS OF PREFERRED EMBODIMENTS

Figure 1:
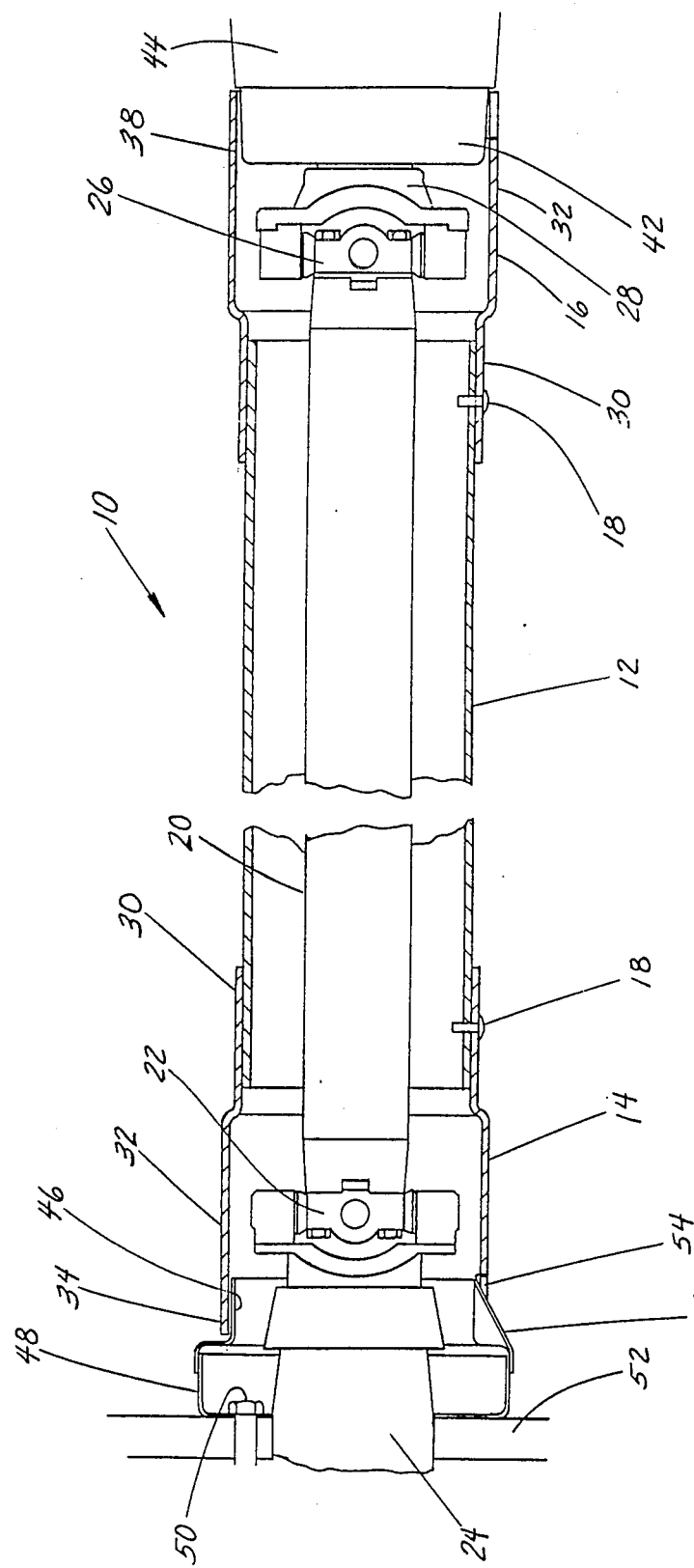
FIG. 1 is a side sectional view of a preferred drive shaft shield assembly in accordance with this invention in mounted position over a front wheel drive shaft.
Figure 2:
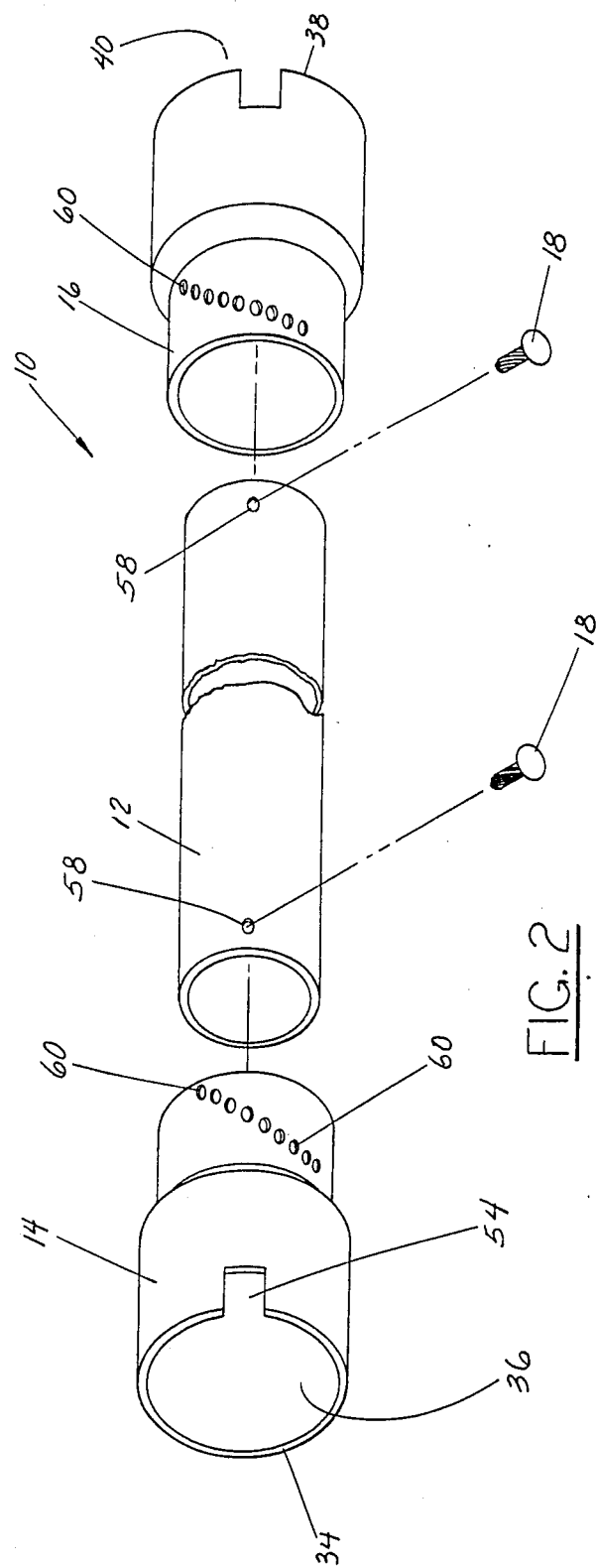
FIG. 2 is an exploded perspective view of the drive shaft shield assembly of FIG. 1 removed from the tractor.

The figures illustrate a drive shaft shield assembly 10 for shielding the full length of a tractor front wheel drive shaft. Shield assembly 10 includes an elongated main tubular member 12, a first tubular end piece 14, a second tubular end piece 16, and a pair of removable ratchet fasteners 18.

Main tubular member 12 is cylindrical and has a length nearly equal to the length of drive shaft 20. First and second tubular end pieces 14 are secured to the opposite ends of main tubular member 12 and extend the length of shield assembly 10 to positions beyond both of the ends of drive shaft 20.

Drive shaft 20 extends from a rear universal joint 22, by which it is connected to an output shaft 24, to a forward universal joint 26, by which it is connected to an input shaft yoke 28. Shield assembly 10 extends over rear and forward universal joints 22 and 26, and is secured at its ends to the tractor by means which will be described.

Each of the tubular end pieces 14 and 16 has an inner section 30 and an outer section 32. Inner and outer sections 30 and 32 are cylindrical. The diameter of inner section 30 is somewhat less than the diameter of outer section 32. Each inner section 30 is sized such that it is slidably engageable over an end of main tubular member 12 in adjustable telescoping fashion. Each inner section 30 has means hereafter described which allow first and second tubular members 14 and 16 to engage the opposite ends of tubular member 12 at desired relative axial positions.

Outer section 32 of each of the tubular end pieces 14 and 16 extends over the ends of drive shaft 20 and over the universal joints at that location. Outer section 32 of first tubular end piece 14 has a first annular edge 34 which forms a first opening 36 at one end of shield assembly 10. Outer section 32 of second tubular end piece 16 has a second annular edge 38 which forms a second opening 40 at the other end of shield assembly 10.

Second annular edge 38 is sized and adapted for sliding telescoping engagement with the tractor. More specifically, second annular edge 38 is inserted concentrically over hub 42 which is part of the tractor near the forward end of drive shaft 20. Hub 42 is circular and extends around the axis of drive shaft 20. In the illustrated embodiment, hub 42 is on the rear of an axle pinion support housing 44. Second annular edge 38 of second tubular end piece 16 fits snugly over hub 42 in a manner such that the degree of insertion of hub 42 into second opening 40 may be varied as the tractor moves during operation.

First annular edge 34, like second annular edge 38, is sized and adapted for sliding telescoping engagement with the tractor. More specifically, first annular edge 34 is inserted concentrically over a hub 46 which is part of the tractor near the rear end of drive shaft 20. Like hub 42, hub 46 is circular and extends around the axis of drive shaft 20.

In the illustrated embodiment, hub 46 is part of a hanger assembly 48 which is attached by bolts 50 to the flywheel housing 52 from which output shaft 24 protrudes. First annular edge 34 of first tubular end piece 14 fits snugly over hub 46 in the same manner as second tubular end piece 16 fits over hub 42. That is, the degree of insertion of hub 46 into first opening 36 may be varied as the tractor moves during operation.

The sliding adjustability of first and second tubular end pieces 14 and 16 on hubs 46 and 42, respectively, allows shield assembly 10 to remain firmly in place while accepting variations in the spacing between hub 46 and hub 42 which occur during operation of the tractor. Such oscillations in the total length of the drive line are readily accommodated by such sliding telescoping engagement.

First tubular end piece 14 has a notch or slot 54 along first annular edge 34 thereof. Hanger assembly 48 includes a key or tooth 56 at one circumferential position on hub 46. Key 56 is dimensioned to be received within slot 54. This slot-key arrangement assures that shield assembly 10 will be restrained from rotation during operation, such as rotation with drive shaft 20. Such rotation should not normally occur, because there is ample spacing between shield 10 and the rotating parts, including drive shaft 20, output shaft 24, input shaft yoke 28, and rear and forward universal joints 22 and 26.

Second tubular end piece 16 may also be slotted and engaged in the same manner with the hub on which it is mounted. However, hub 42 has no key. Second tubular end piece 16 is made identical to first tubular end piece 14 merely for convenience in manufacture and in assembly.

Ratchet fasteners 18 form locking means to attach tubular end pieces 14 and 16 to the ends of main tubular member 12, as previously indicated. A hole 58 extends through main tubular member 12 near each end. A series of offset holes 60 extend through inner section 30 of each of the tubular end pieces 14 and 16. The relative axial positions of each of the tubular en pieces may be fixed with respect to main tubular member 12 by inserting a ratchet fastener 18 through hole 58 in main tubular member 12 and that one offset hole 60 which is appropriate for the desired relative axial positions. Ratchet fasteners 18 are removable pins of a type which may be frictionally inserted through a pair of aligned holes and will remain in place until forcefully removed.

To remove shield assembly 10, one or both of ratchet fasteners 18 are removed allowing one or both of tubular end pieces 14 and 16 to be slid further onto main tubular member 12. Such action shortens tubular shield assembly 10 to expose one or both of the ends of drive shaft 20. An exposed end of drive shaft 20 allows disconnection of the universal joint, which facilitates complete removal of the shield.

For example, sliding of first tubular end piece 14 farther onto main tubular member 12 exposes rear universal joint 22. When rear universal joint 22 is disconnected, drive shaft 20 may be swung away from output shaft 24, at which point shield assembly 10 may be removed entirely by sliding it off drive shaft 20. Or, both of the universal joints could be detached when they are both exposed by movement of their covering tubular end pieces along main tubular member 12.

To reassemble shield assembly 10 over drive shaft 20, any of the removal operations may be carried out in reverse.

Drive shaft shield assembly 10 may be made of common widely available materials. It is preferred that the tubular members of shield assembly 10 be made of steel or of a tough plastic material, such as polyvinyl chloride. Hanger assembly 48 is preferably made of steel, and preferably includes two parts which are spot welded or otherwise attached to one another.

The hanger assembly, while preferably circular and preferably extending a complete 360 degrees, could be in other forms. For example, the hub may extend over 180 degrees but less than 360 degrees, and such would allow the tubular shield to be centered with respect to the drive shaft. The hanger assembly, rather than being a continuous hub, could be a number of tabs oriented on a circle to support the shield assembly in the proper position.

It is highly preferred that the tubular shield have a main tubular member and a pair of tubular end pieces, as shown in the drawings. However, the shield could instead have only two telescoping tubular members. In such case, one or both of the ends of the drive shaft could be exposed by sliding the two tubular members further onto each other, after which removal would continue as described above. Other variations in the combination of telescoping tubular members are possible.

While the principles of this invention have been described in connection with specific embodiments, it should be understood clearly that these descriptions are made only by way of example and are not intended to limit the scope of the invention.

What is claimed:

1. In a shield for a work vehicle drive shaft of the type shielding the full length of the drive shaft, the improvment comprising:
    a plurality of telescoping tubular members forming a continuous tube extending from a first opening at one end of the drive shaft to a second opening at the other end of the drive shaft;
    means at the first and second openings to variably slidably secure the continuous tube to the work vehicle to accommodate dimensional variation between the points of attachment to the work vehicle during operation thereof; and
    means to lock the tubular members into fixed relative axial positions, said locking means comprising alignable holes in each member of at least one pair of adjacent telescoping members and removable pin means inter connecting said holes,
    whereby the shield may be substantially shortened to expose the ends and facilitate drive shaft and/or shield removal.

2. The device of claim 1 wherein the plurality of telescoping tubular members comprise a main tubular member and at least one tubular end piece slidably engaged therewith, the end piece forming one of the openings.

3. The device of claim 2 comprising two tubular end pieces each forming one of the first and second openings.

4. The device of claim 1 wherein the securing means at the first opening comprises a first annular edge forming the first opening, the first edge adapted for sliding telescoping engagement with the work vehicle beyond said one end of the drive shaft.

5. The device of claim 4 wherein the securing means at the second opening comprises a second annular edge forming the second opening, the second edge adapted for sliding telescoping engagement with the work vehicle beyond said other end of the drive shaft.

6. The device of claim 5 wherein the first and second annular edges are circular and are sized to receive circular hubs extending around the drive shaft axis.

7. The device of claim 4 wherein the annular edge is circular and is sized to receive a circular hub extending around the drive shaft axis.

8. The device of claim 7 wherein the plurality of telescoping tubular members comprise a main tubular member and at least one tubular end piece slidably engaged therewith, the end piece forming one of the openings.

9. The device of claim 8 comprising two tubular end pieces each forming one of the first and second openings.

10. The device of claim 7 further including means in the continuous tube restraining the tube from rotation.

11. The device of claim 10 wherein the restraining means comprises a slot means along the first annular edge adapted to receive a fixed key along the circular hub.

12. The device of claim 1 wherein one telescoping member of each adjacent pair of telescoping members has a series of holes in different positions along a portion of its length, such that the length of the continuous tube may be adjustably fixed.

13. The device of claim 12 wherein the plurality of telescoping tubular members comprise a main tubular member and at least one tubular end piece slidably engaged therewith, the end piece forming one of the openings.

14. The device of claim 13 comprising two tubular end pieces each forming one of the first and second openings.

15. The device of claim 14 wherein the securing means at the first opening comprises a first annular edge forming the first opening, the first edge adapted for sliding telescoping engagement with the work vehicle beyond said one end of the drive shaft.

16. The device of claim 15 wherein the annular edge is circular and is sized to receive a circular hub extending around the drive shaft axis.

17. The device of claim 16 further including a slot along the first annular edge, said slot adapted to receive a key along the circular hub to restrain the continuous tube from rotation.

* * * * *